Aug. 23, 1955
G. C. CARR
2,715,970
AUTO VEHICLE PARKING STRUCTURE
Filed Oct. 7, 1952
5 Sheets-Sheet 1
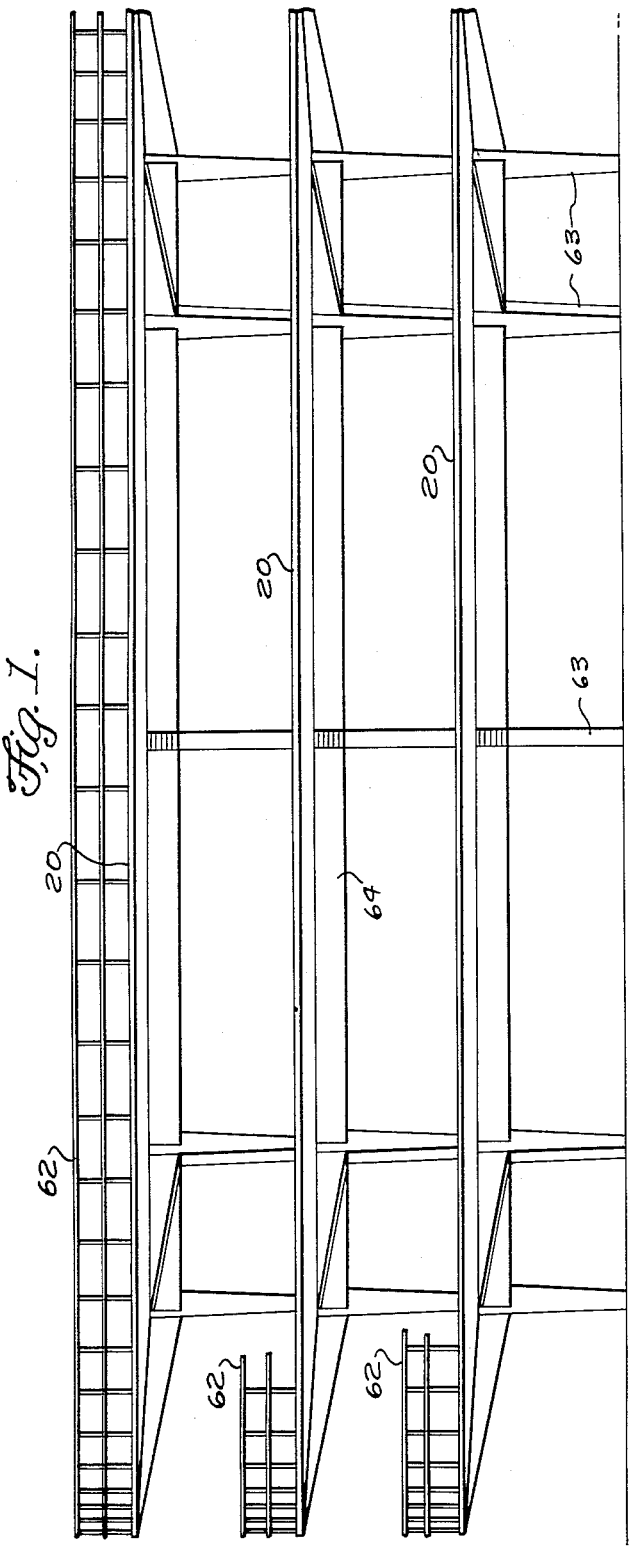
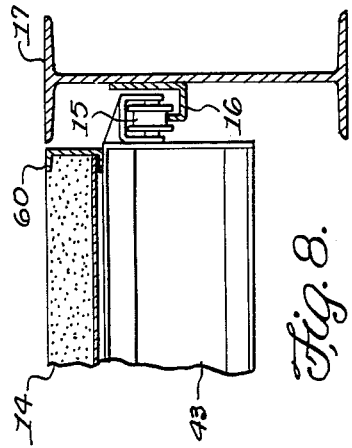
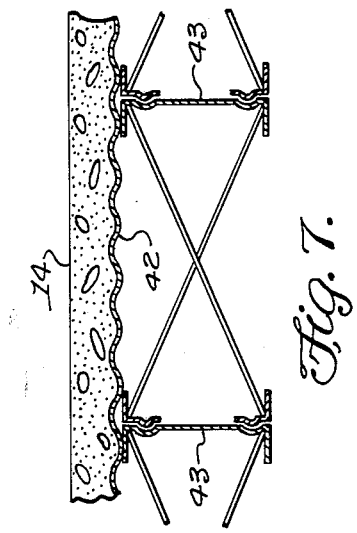
INVENTOR.
Guy C. Carr,
BY Victor J. Evans & Co.
ATTORNEYS

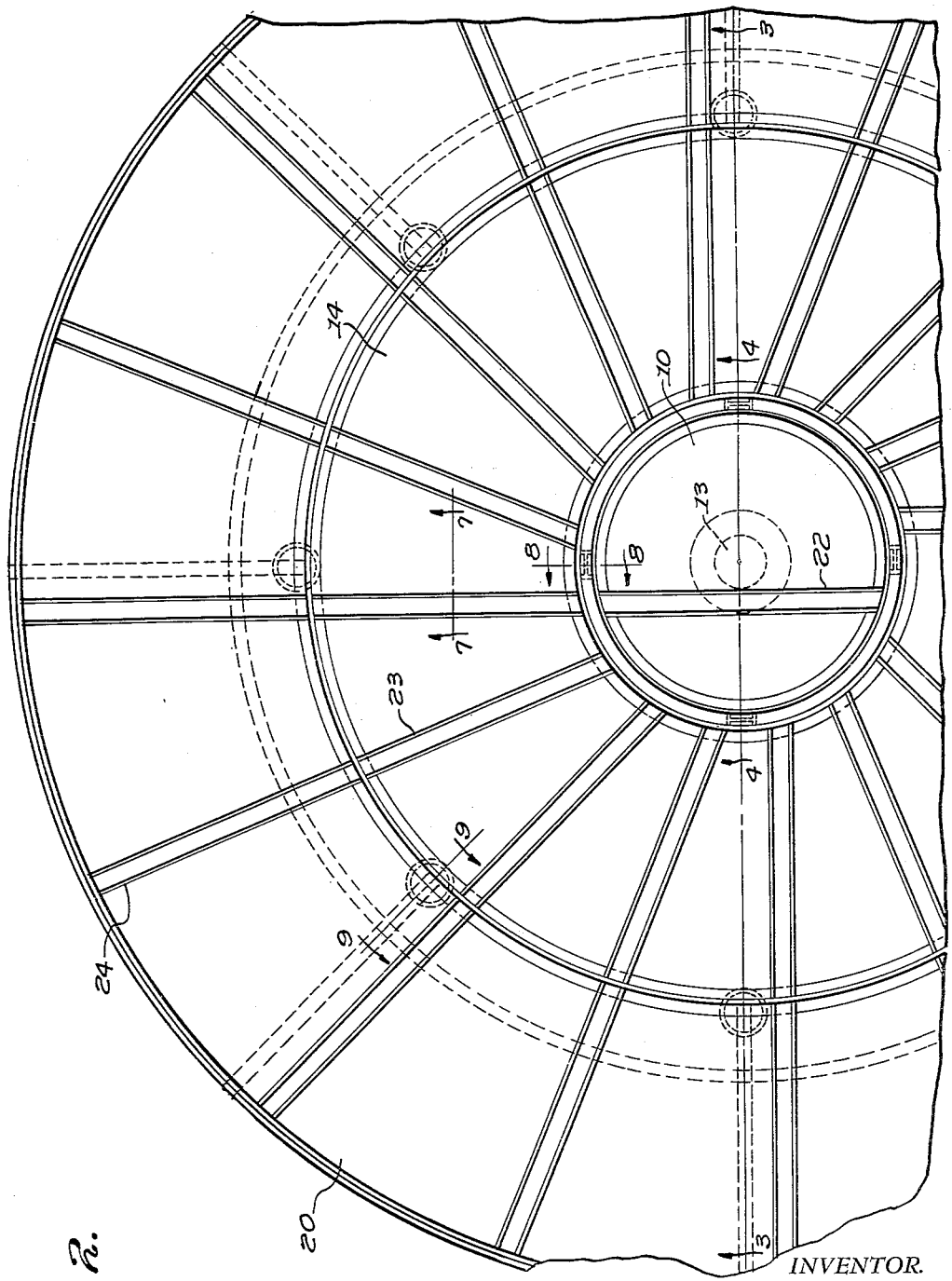

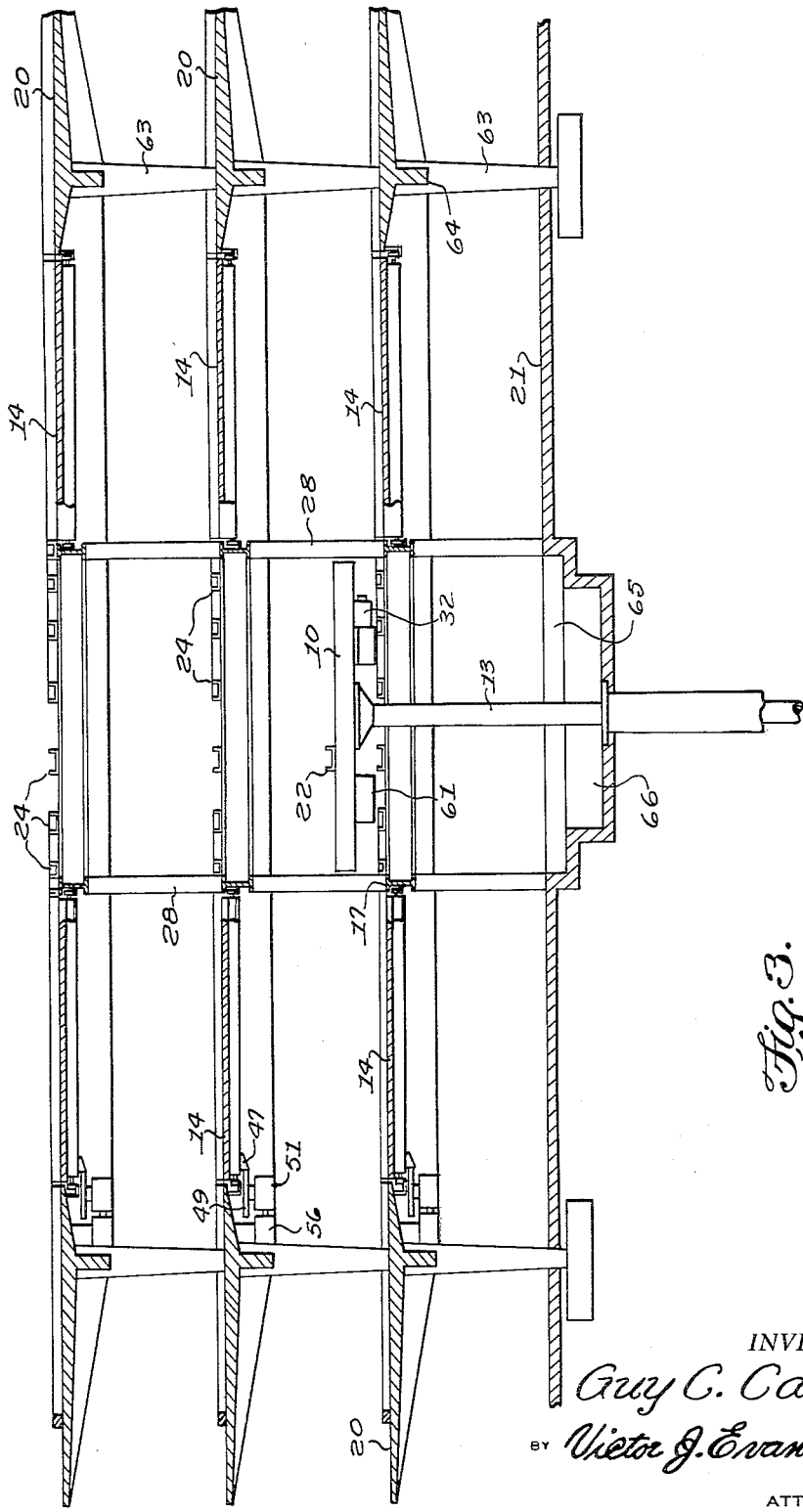

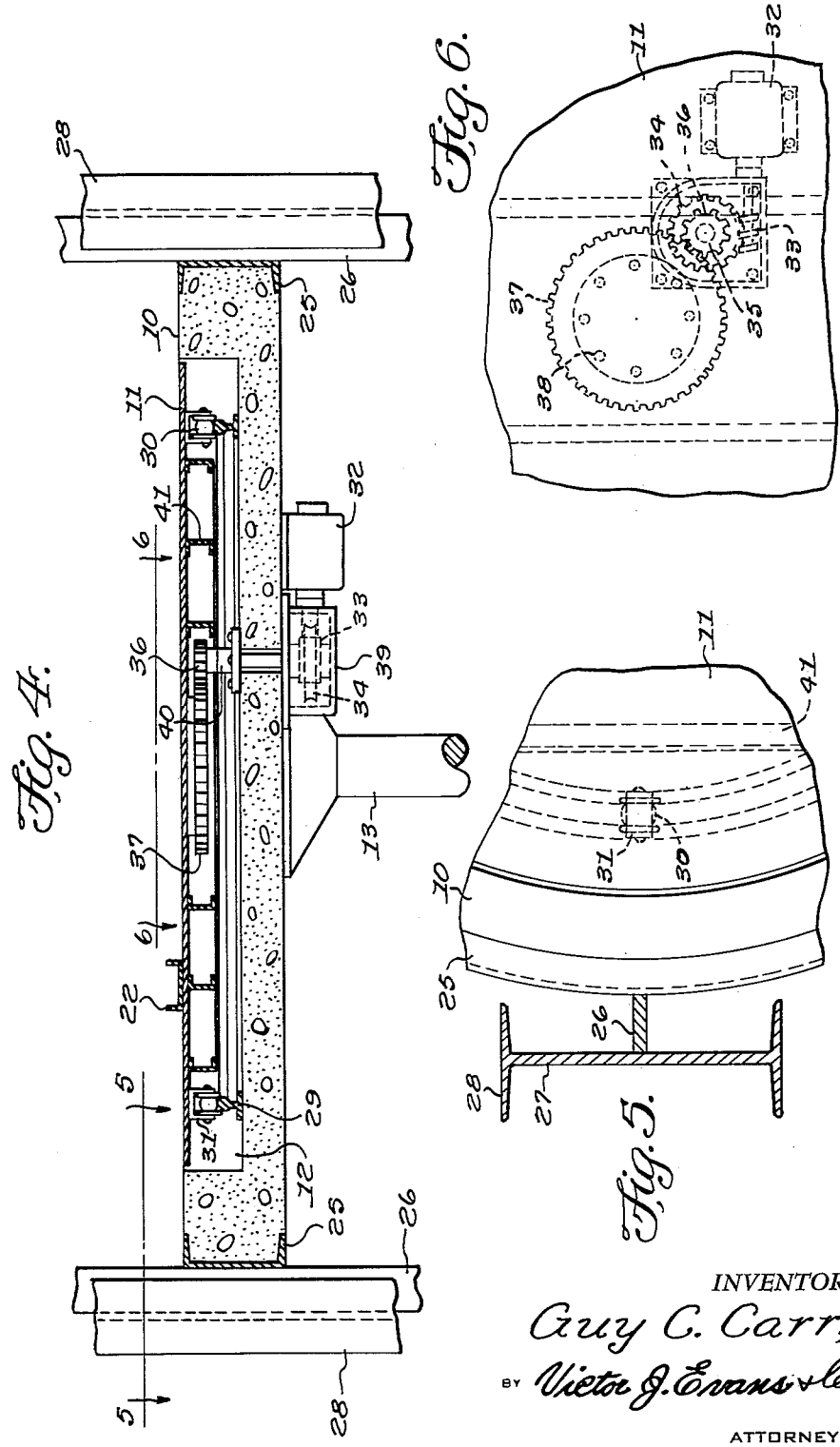

Aug. 23, 1955  G. C. CARR  2,715,970
AUTO VEHICLE PARKING STRUCTURE
Filed Oct. 7, 1952  5 Sheets-Sheet 5
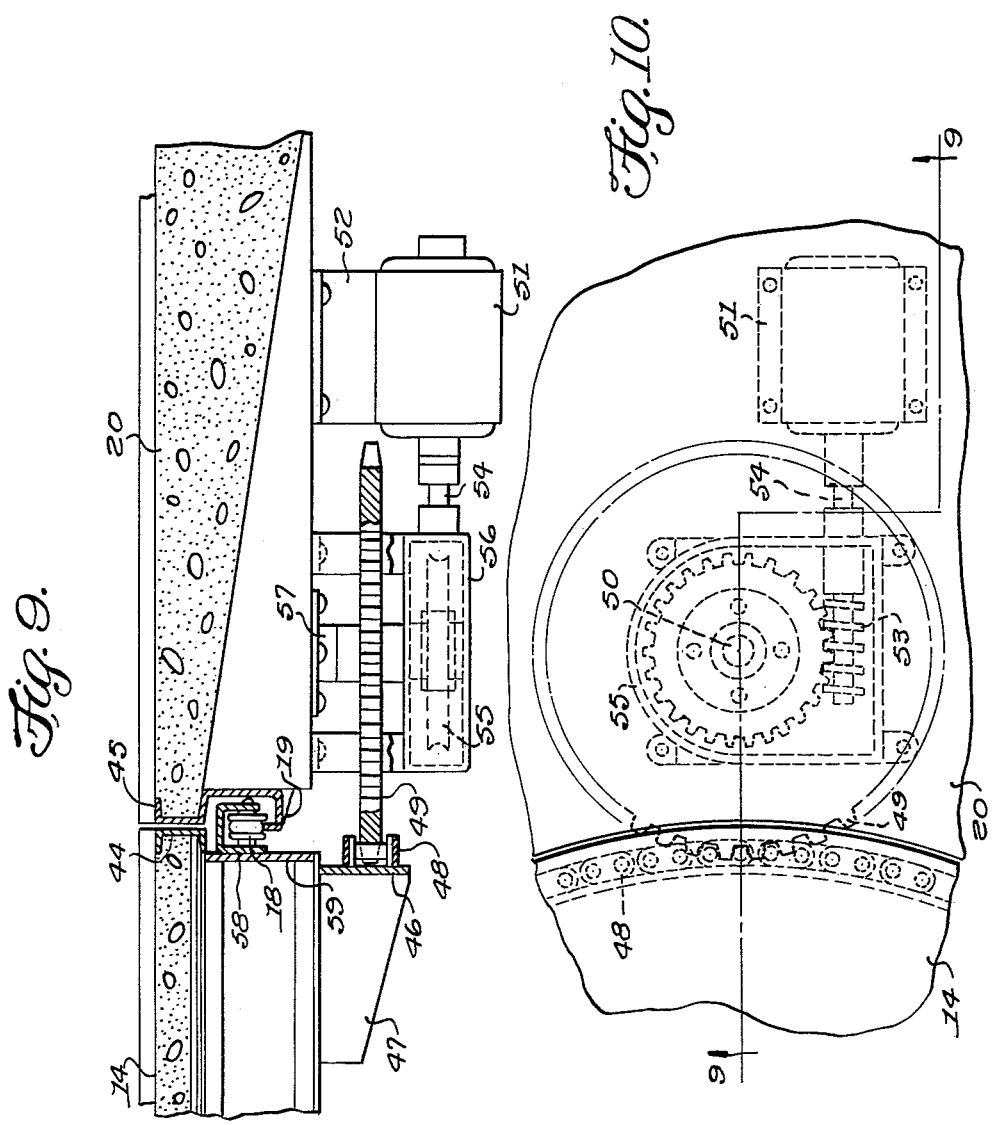
INVENTOR.
Guy C. Carr,
BY Victor J. Evans + co.
ATTORNEYS

# United States Patent Office 2,715,970
Patented Aug. 23, 1955

2,715,970
AUTO VEHICLE PARKING STRUCTURE

Guy C. Carr, Beaverton, Oreg.

Application October 7, 1952, Serial No. 313,395

1 Claim. (Cl. 214—16.1)

This invention relates to garages or other structures for parking motor vehicles by elevators on superimposed floors, and in particular a structure having a plurality of circular floors with a centrally positioned elevator having a rotatable platform and with an intermediate circular platform mounted to travel between the elevator and an outer circular platform for distributing vehicles from the elevator to the outer platform, and upon which parking areas are also provided.

The purpose of this invention is to provide means for expediting the travel of motor vehicles from and to an elevator wherein vehicles may be stored on an intermediate traveling platform and also on a stationary platform positioned around the intermediate platform.

Various types of devices have been provided for storing motor vehicles and different types of movable platforms have been provided for receiving vehicles from an elevator, however, to improve the efficiency of parking devices of this type it has been found advisable to provide distributing means between an elevator and stationary storage areas in which vehicles may also be parked on the distributing means. With this thought in mind this invention contemplates a motor vehicle parking structure having a plurality of vertically spaced floors with circular parking areas positioned around an elevator and with a platform of the elevator and also an intermediate circular platform between the elevator and a stationary platform, mounted to travel about the center of the elevator.

The object of this invention, is therefore, to provide improved distributing means between an elevator and storage areas of a motor vehicle parking structure wherein the platform of the elevator and also an intermediate platform around the elevator are rotatable in horizontal planes to bring wheel guide channels upon the platforms in registering relation.

Another object of this invention is to provide a motor vehicle storage structure having an intermediate distributing platform between an elevator and stationary parking areas in which the intermediate platform is also adapted for use as a parking area.

A further object of the invention is to provide an improved motor vehicle parking structure having circular floors wherein a centrally disposed elevator and a traveling intermediate platform positioned between the elevator and stationary parking areas wherein the structure is of a comparatively simple and economical construction.

With these and other objects and advantages in view the invention embodies a plurality of vertically spaced floors having stationary outer sections with an elevator having a motor vehicle carrying platform thereon positioned in the structure and with a traveling intermediate platform positioned between the elevator and stationary outer sections and wherein the elevator and intermediate platforms are provided with independent rotating means.

Other features and advantages of the invention will appear from the following description taken in connection with the drawing, wherein:

Figure 1 is a side elevational view illustrating the improved parking structure with the center elevator omitted and with parts of rails on the outer edges of the floors broken away.

Figure 2 is a plan view showing a section of the improved motor vehicle parking structure with parts broken away and showing, in particular, guide channels for guiding wheels at one side of a vehicle from the elevator platform to parking areas and from the parking areas to the elevator platform.

Figure 3 is a vertical section through the improved motor vehicle parking structure taken on line 3—3 of Figure 2 showing the elevator with the platform thereof positioned slightly above one of the floors of the structure.

Figure 4 is a vertical section through the elevator platform taken on line 4—4 of Figure 2 illustrating the mounting and operating means of a turn table in the platform, the parts being shown on an enlarged scale.

Figure 5 is a detail showing a sectional plant taken on line 5—5 of Figure 4 showing a guide bar positioned between the elevator platform and the supporting column of the structure.

Figure 6 is a detail taken on line 6—6 of Figure 4 showing a plan view of the operating instrumentalities of the turn table of the elevator platform.

Figure 7 is a detail showing a section taken on line 7—7 of Figure 2 illustrating the construction of the intermediate revolving platform.

Figure 8 is a detail showing a section taken on line 8—8 of Figure 2 illustrating the supporting rollers on the inner edge of the intermediate platform and showing a track on a beam at the inner edge of the stationary platform and upon which the rollers travel.

Figure 9 is a detail also showing the parts on an enlarged scale, taken on line 9—9 of Figure 10 and illustrating the driving element for rotating the intermediate platform.

Figure 10 is a plan view of the intermediate platform rotating means, as shown in Figure 9.

Referring now to the drawings wherein like reference characters denote corresponding parts the improved motor vehicle parking structure of this invention includes an elevator of the hydraulic type having an elevator platform 10 with a turn table 11 mounted in a recess 12 therein, a vertically positioned shaft 13 on the upper end of which the elevator platform is mounted, an intermediate annular platform 14 supported at the inner edge with rollers 15 on a circular track 16 carried by a beam 17 and at the outer edge with rollers 18 traveling on a circular track 19 carried by the inner edge of an outer stationary circular platform or floor member 20.

The elevator platform 10 is actuated by conventional means whereby vehicles driven on the platform from a floor portion 21, with the wheels at one side in a guide channel 22 are elevated to the different floors and with the platform in registering relation with a floor the turn table 11 is rotated whereby the guide channel 22 registers with one of the guide channels 23 on the intermediate platform 14, and with the vehicle rolled to a position on the intermediate platform the intermediate platform is rotated until one of the guide channels 23, in which the wheels of the vehicle are positioned, registers with the one of the guide channels 24 on the outer stationary platform 20.

As illustrated in Figure 4, the elevator platform 10 is formed with a concrete slab surrounded with a circular channel member 25, the outer surface of which bears against and travels on guide bars 26 mounted on webs 27 of vertically disposed I-beams 28, which form supporting columns for the inner edge of the traveling intermediate platform 14.

The turntable 11 of the elevator platform is mounted on a circular rail 29 in the recess 12 with rollers 30, that are journaled in bearings 31, and the turntable is rotated by a motor 32 carried by the platform and operatively connected to the turntable with a worm 33 on the motor shaft meshing with a worm gear 34 on a stub shaft 35, and the shaft 35 is also provided with a gear 36 that meshes with a gear 37 which is secured to the under surface of the turntable 11 with a bolt 38. The gears 33 and 34 are mounted in a gear housing 39 and the shaft 35 extends through the lower portion of the platform and is journaled in a bearing 40. The turntable 11 is reinforced with spaced channels 41 and the wheel guide channel 22 is secured to the upper surface. The circular rail 17 which carries the track 16 for the rollers 15 on the inner edge of the platform 14, is supported by the columns 28.

The platform 14 is also formed with a concrete slab and the slab is supported by a corrugated sheet 42 which is carried on trusses as indicated by the numeral 43, and illustrated in Figure 7.

The outer edge of the intermediate platform 14 is provided with a circular channel member 44 that is positioned to correspond with a channel number 45 on the inner edge of the stationary platform 20, as shown in Figure 9, and the intermediate platform is also provided with a circular band 46 that is supported by brackets 47 from the trusses 43, also as shown in Figure 9. The outer surface of the band 46 is provided with an endless chain 48 that meshes with teeth of a sprocket 49 on a sub shaft 50, and the shaft 50 is rotated by a motor 51, which is suspended from the platform 20 by a bracket 52, with a worm 53 mounted on the motor shaft 54. The worm 53 meshes with a worm gear 55 on the shaft 50, as shown in Figure 10. The worm gears are positioned in a gear housing 56 and the shaft 50 is journaled in a bearing 57 that is secured to the under surface of the stationary platform 20.

The rollers 18 on the outer edge of the intermediate platform 14 are journaled in bearings 58 that are mounted on the outer surface of an annular flange 59 which is secured to the ends of trusses 43 on the inner edge of the traveling intermediate platform 14 which is also provided with a continuous channel member, as indicated by the numeral 60. The upper edge of the channel number 60 is substantially in meeting relation with the edge of the upper flange of the beam 17.

The elevator platform 10 may be provided with a counter-weight 61, as shown in Figure 3 to balance the weight of the motor and gear assembly at the opposite side of the platform.

The outer edges of the stationary platforms may be provided with rails or fences, as indicated by the numeral 62.

The stationary platforms are supported by columns 63 which are positioned at spaced points and the platforms may be reinforced with beams 64 which extend between the columns.

The floor 21 is provided with a well 65 in which the elevator platform is positioned with the elevator at the lower level and a continuous recess 66 is provided in the well to accommodate the motor counter-weight.

With the parts arranged in this manner a vehicle is driven upon the platform 10 with the platform in the low or bottom position, with the wheels at one side of the vehicle rolling into the channel 22, and with the vehicle positioned on the platform the platform is elevated to the level of one of the floors. With the elevator in position at one of the floors the intermediate platform and also the turntable of the elevator may be rotated until the channel 22 registers with an unoccupied channel 23 on the intermediate platform, at which time the vehicle is rolled upon the intermediate platform. The intermediate platform may then be rotated until the channel 23 thereof registers with a suitable channel 24 on the stationary platform at which time the vehicle may be rolled to the stationary platform.

With the turntable of the elevator and the intermediate platform operated by independent motors the two elements may be rotated at the same time to expedite moving the channels into registering relation.

It will be understood that modifications within the scope of the appended claim may be made in the design and arrangements of the parts without departing from the spirit of the invention.

What is claimed is:

A motor vehicle parking structure, comprising an elevator platform provided with a recess in its upper surface, a turntable mounted in said recess, a vertically disposed shaft having its upper end connected to said elevator platform, a plurality of vertically disposed columns arranged in spaced parallel relation with respect to each other, a plurality of stationary circular floor members supported by said columns, horizontally disposed reinforcing beams extending between said columns and secured thereto, an annular platform arranged centrally within each of said floor members, a floor portion arranged below said platforms and floor members, said floor portion being provided with a well, there being a recess in the bottom of said floor portion below said well, a U-shaped guide channel secured to the upper surface of said turntable, a plurality of spaced apart guide channels secured to the upper surfaces of said annular platforms, a plurality of spaced guide channels secured to the upper surfaces of said floor members, said guide channels adapted to receive the wheels of a vehicle, said elevator platform having a circular channel member on its outer periphery, guide bars engaged by said circular channel member, webs for supporting said guide bars, a circular rail arranged in the recess in said elevator platform, rollers depending from said turntable and engaging said last named rail, a motor supported below said elevator platform, a first shaft driven by said motor, a second shaft arranged at right angles to said first shaft, worm gear means interconnecting said shafts together, a gear member secured to the undersurface of said turntable, intermeshing gears connecting said gear member to said second shaft, opposed circular channel members on the adjacent edges of said annular platform and floor members, a circular band depending from said annular platform, an endless chain arranged in engagement with said band, a sprocket having teeth arranged in engagement with said chain, a motor depending from said floor member for rotating said sprocket, a counterweight on the bottom of said elevator platform, and fences on the outer edges of said floor members.

References Cited in the file of this patent

UNITED STATES PATENTS

| 1,528,893 | Rother | Mar. 10, 1925 |
| 1,568,384 | Pungs | Jan. 5, 1926 |
| 1,966,165 | Clyde | July 10, 1934 |

FOREIGN PATENTS

| 260,722 | Great Britain | Nov. 11, 1926 |
| 251,316 | Italy | Dec. 29, 1926 |